United States Patent [19]
Van Doorn et al.

[11] Patent Number: 4,965,341
[45] Date of Patent: Oct. 23, 1990

[54] POLYMERIZATION OF CO/OLEFIN WITH CATALYST COMPRISING SULFUR BIDENTATE LIGAND

[75] Inventors: Johannes A. Van Doorn; Eit Drent, both of Amsterdam, Netherlands

[73] Assignee: Shell Oil Company, Houston, Tex.

[21] Appl. No.: 352,235

[22] Filed: May 15, 1989

[30] Foreign Application Priority Data

Jun. 8, 1988 [NL] Netherlands .......................... 8801472

[51] Int. Cl.$^5$ ............................................. C08G 67/02
[52] U.S. Cl. ..................................................... 528/392
[58] Field of Search ........................................... 528/392

[56] References Cited

U.S. PATENT DOCUMENTS 3,694,412  9/1972  Nozaki ............................ 260/63 CQ
4,788,279  11/1988  Drent ................................... 528/392

FOREIGN PATENT DOCUMENTS 181014   5/1986   European Pat. Off. .
213671   3/1987   European Pat. Off. .
239145   9/1987   European Pat. Off. .
248483  12/1987   European Pat. Off. .
257663   3/1988   European Pat. Off. .
305011   3/1989   European Pat. Off. .
121965  10/1984   Japan .

OTHER PUBLICATIONS

Chemical Abstract, vol. 91, pp. 265-277.

*Primary Examiner*—Harold D. Anderson
*Attorney, Agent, or Firm*—Dean F. Vance

[57] ABSTRACT

A process for the production of linear alternating polymers of carbon monoxide and at least one ethylenically unsaturated hydrocarbon employs a novel catalyst composition form from a palladium compound, the anion of certain string acids and a bidentate ligand of sulfur. The copolymer of carbon monoxide and a styrene monomer by such process is regioregular but not stereoregular.

13 Claims, No Drawings

POLYMERIZATION OF CO/OLEFIN WITH CATALYST COMPRISING SULFUR BIDENTATE LIGAND

FIELD OF THE INVENTION

This invention relates to a process for the production of linear alternating polymers of carbon monoxide and at least one ethylenically unsaturated hydrocarbon. More particularly, the invention relates to such a process, a novel catalyst composition employed in the process and, in a particular embodiment of the invention, a novel copolymer of carbon monoxide and a styrene which is made by the process.

BACKGROUND OF THE INVENTION

The class of polymers of carbon monoxide and olefin(s) has been known in the art for some time. Brubaker, U.S. Pat. No. 2,495,286, produced such polymers of relatively low carbon monoxide content in the presence of free radical initiators, e.g., peroxy compounds. U.K. No. 1,081,304 produced similar polymers of higher carbon monoxide content in the presence of alkyl phosphine complexes of palladium as catalyst. Nozaki extended the reaction to produce linear alternating polymers in the presence of arylphosphine complexes of palladium moieties and certain inert solvents. See U.S. Pat. No. 3,694,412, for example.

The linear alternating polymers have been shown to be of the general repeating formula -CO(A) wherein A is the moiety of ethylenically unsaturated hydrocarbon. By way of specific illustration, when the polymer is a copolymer of carbon monoxide and ethylene, the copolymer will be of the repeating formula -CO(CH$_2$—CH$_2$)-.

More recently, the class of linear alternating polymers, now becoming known as polyketones or polyketone polymers, has become of greater interest because of the greater availability of the polymers. Many of the more recent processes for the production of the linear alternating polymers are illustrated by a number of published European Patent Application Nos. including 121,965, 181,014, 213,671 and 257,633. Such processes involve the use of a catalyst composition formed from a salt of a Group VIII metal selected from palladium, cobalt or nickel, the anion of a non-hydrohalogenic acid having a pKa below about 6 and a bidentate ligand of phosphorus, arsenic or antimony. The scope of the polymerization process is extensive but, without wishing to be limited, a preferred catalyst composition is formed from a palladium carboxylate, especially palladium acetate, the anion of a non-hydrohalogenic acid having a pKa below 2 and a bidentate ligand of phosphorus. For some particular applications it has been found useful to employ other bidentate ligands. For example, in U.S. Pat. No. 4,788,279 there is disclosed a process for producing a copolymer of carbon monoxide and styrene which employs a nitrogen bidentate ligand of the formula

wherein X and Y are the same or different organic bridging groups containing 3 or 4 atoms in the bridge at least 2 of which are carbon atoms. The compound 2,2'-bipyridine is an example of such a ligand. In copending U.S. patent application Ser. No. 140,013, filed Dec. 12, 1987 and Ser. No. 350,828, filed May 12, 1989 there are disclosed catalyst compositions useful for the production of polyketone polymers which are formed from, inter alia, sulfur- or selenium-containing bidentate ligands. It would be of advantage, however, to provide additional processes and additional catalyst compositions useful for the production of linear alternating polymers of carbon monoxide and ethylenically unsaturated hydrocarbons.

SUMMARY OF THE INVENTION

The present invention provides a novel process for the production of linear alternating polymers of carbon monoxide and at least one ethylenically unsaturated hydrocarbon. More particularly, there are provided, according to the invention, a process and a novel catalyst composition formed from a bidentate sulfur ligand which are useful in the production of the linear alternating polymers. In the special case of polymerization of carbon monoxide and a styrene monomer, a novel carbon monoxide/styrene copolymer is provided.

DESCRIPTION OF THE INVENTION

The process of the present invention comprises the polymerization of carbon monoxide and at least one ethylenically unsaturated hydrocarbon in the presence of a catalyst composition formed from a palladium salt, the anion of a non-hydrohalogenic acid having a pKa below 4 and a bidentate ligand of sulfur. The ethylenically unsaturated hydrocarbons useful as precursors of the linear alternating polymers have up to 20 carbon atoms inclusive, preferably up to 10 carbon atoms inclusive, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on the carbon atom of the ethylenic unsaturation. Illustrative of this latter class of unsaturated hydrocarbons are styrene and ring-substituted styrenes such as p-methylstyrene, p-ethylstyrene and m-isopropylstyrene. Also suitable are cyclic ethylenically unsaturated hydrocarbons such as norbornene and dicyclopentadiene. Preferred polyketone polymers are copolymers of carbon monoxide and ethylene or styrene and terpolymers of carbon monoxide, ethylene or styrene, and a second dissimilar ethylenically unsaturated hydrocarbon. Particularly preferred terpolymers are terpolymers of carbon monoxide, ethylene and styrene or propylene.

In the modification of the invention where terpolymers of carbon monoxide, ethylene or styrene and a second dissimilar ethylenically unsaturated hydrocarbon are produced, there will be at least about two units incorporating a moiety of the ethylene or styrene for each unit incorporating a unit of the second dissimilar hydrocarbon. Preferably, there will be from about 10 to about 100 units of ethylene or styrene for each unit of the second dissimilar hydrocarbon. The polymer chain of the preferred polyketone polymers of the invention is therefore represented by the repeating formula

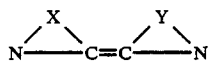 (I)

wherein G is a moiety of ethylene or styrene polymerized through the ethylenic unsaturation and G' is the moiety of a second hydrocarbon, i.e., a hydrocarbon other than G, polymerized through the ethylenic unsaturation. The -CO(G) units and the -CO(G') units are formed randomly throughout the polymer chain and the ratio of y:x is no more than about 0.5. When copolymers of carbon monoxide and ethylene or styrene are produced according to the process of the invention, there will be no second hydrocarbon present and the copolymers are represented by the above formula I wherein y is 0. When y is other than 0, i.e., terpolymers are produced, the ratio of y:x is from about 0.01 to about 0.1. The end groups or "caps" of the polymer chain will depend upon what materials are present during the polymerization process and whether and how the polymer has been purified. The precise nature of the end groups is of little significance so far as the overall properties of the polymer are concerned so that the polymer is fairly depicted by the above formula for the polymer chain.

Of particular interest are the polyketone polymers of number average molecular weight from about 1000 to about 200,000, particularly those of number average molecular weight from about 20,000 to about 90,000 as determined by gel permeation chromatography. The physical properties of such polymers will depend in part on the molecular weight of the polymers whether the polymer is a copolymer or a terpolymer and, in the case of terpolymers, the nature of and the proportion of the second hydrocarbon present. Typical melting points for such polymers will be from about 175° C. to about 300° C., preferably from about 210° C. to about 270° C.

The process of the invention comprises the contacting, under polymerization conditions, of the carbon monoxide and ethylenically unsaturated hydrocarbon in a reaction diluent in the presence of a catalyst formed from a palladium salt, the anion of a non-hydrohalogenic acid having a pKa below 4 (as determined in aqueous solution at 18° C.) and a bidentate ligand of sulfur. Although a variety of palladium salts are useful in the catalyst compositions of the invention, palladium carboxylates are preferred such as palladium acetate, palladium propionate, palladium butyrate and palladium octanoate. Particularly preferred as the palladium salt is palladium acetate.

The anion precursor of the catalyst composition is the anion of a non-hydrohalogenic acid having a pKa below 4 and preferably below 2. Suitable anions include the anions of inorganic acids such as sulfuric acid and perchloric acid and anions of organic acids including sulfonic acids, e.g., methanesulfonic acid, trifluoromethanesulfonic acid and p-toluenesulfonic acid and including carboxylic acids such as trichloroacetic acid, difluoroacetic acid and trifluoroacetic acid. The preferred anions are the anions of trifluoroacetic acid or p-toluenesulfonic acid. The anion is preferably provided in the form of the free acid, but alternatively is provided as a metal salt, particularly a non-noble transition metal salt such as a copper salt. In yet another modification, the palladium and the anion are provided in the form of a single compound, e.g., palladium p-toluenesulfonate or acrylonitrile complexes thereof.

The bidentate ligand of sulfur is an organic compound of up to 20 carbon atoms inclusive containing two atoms of sulfur connected by a bridging group having at least two carbon atoms in the bridge wherein each sulfur independently is substituted with an organic radical which is aliphatic, aromatic, alkylaromatic or arylaliphatic. One class of such bidentate ligands of sulfur is represented by the formula

  (II)

wherein R' independently is alkyl, aryl, alkaryl or arylalkyl and R is aromatic, saturated or ethylenically unsaturated hydrocarbyl of up to 8 carbon atoms inclusive and having at least two carbon atoms in the sulfur-sulfur bridge. Illustrative of such bidentate sulfur ligands are 1,2-di(ethylthio)ethane, 1,2-di(phenylthio)ethane, 1,3-di(methylthio)propane, 1,2-bis(2,4-dimethylphenylthio)ethane, 1,2-di(benzylthio)propane, 1,2-di(2-methoxyphenylthio)ethane, 1-methylthio-3-ethylthiopropane, 1,4-di(butylthio)butane, 1,3-di(methylthio)benzene, cis-1,2-di(benzylthio)ethene and cis-1,2-di(methylthio)ethene. The preferred bidentate ligands are those wherein R' is alkylene of from 2 to 4 carbon atoms inclusive and R is alkyl including aralkyl or aryl including alkaryl.

It is also useful on occasion to include within the mixture from which the catalyst composition is formed as an optional fourth component an organic oxidizing agent. Illustrative of useful optional fourth components are aliphatic nitrites such as butyl nitrite, aromatic nitro compounds such as nitrobenzene and 2,4-dinitrogenzene and 1,2- or 1,4-quinones. The class of quinones is preferred and benzoquinones, naphthoquinones and anthraquinones are satisfactory. The 1,4-quinones are preferred over the corresponding 1,2-quinones and 1,4-benzoquinone is particularly preferred.

The quantity of catalyst composition and the proportions of the components thereof may vary within wide limits. The quantity of catalyst composition should be sufficient to provide from about $1 \times 10^{-7}$ mol to about $1 \times 10^{-3}$ mol of palladium per mol of ethylenically unsaturated hydrocarbon to be polymerized. Quantities of palladium from about $1 \times 10^{-6}$ mol to about $1 \times 10^{-4}$ mol per mol of ethylenically unsaturated hydrocarbon are preferred. The anion and bidentate ligand are independently employed in an amount of from about 1 equivalent to about 1000 equivalents per mol of palladium with quantities from about 2 equivalents to about 100 equivalents per mol of palladium being preferred. The presence of the organic oxidant is optional and no fourth component of the catalyst composition mixture is required. If the organic oxidant is present it is present in a quantity of up to about 10,000 mols per mol of palladium but more often, when present, the oxidant is employed in a quantity of from about 10 mols to about 5000 mols per mol of palladium.

The polymerization is conducted under polymerization conditions which typically include a reaction temperature of from about 20° C. to about 150° C., preferably from about 30° C. to about 130° C. Suitable reaction pressures are from about 2 bar to about 150 bar with pressures from about 35 bar to about 100 bar being preferred. The ratio of carbon monoxide to ethylenically unsaturated hydrocarbon is not critical and molar ratios of from about 10:1 to about 1:10 are suitable. Better results are generally obtained with a molar ratio of carbon monoxide to ethylenically unsaturated hydrocarbon from about 5:1 to about 1:5. The monomeric reactants are contacted in the presence of the catalyst composition and a reaction diluent, preferably a diluent in which the polymer product is substantially insoluble. Suitable diluents include lower alkanols, e.g., methanol or ethanol, lower alkanones such as acetone or mixtures thereof. Methanol is preferred as the reaction diluent. Reactant contact is maintained during polymerization by conventional methods such as shaking or stirring and subsequent to reaction the polymer product is recovered by well known procedures such as filtration or decantation. The polymer is used as recovered or is purified, if desired, by contacting the polymer with a solvent or complexing agent which is selective for the catalyst residues.

The process of the invention offers a number of advantages over the more conventional processes for polyketone polymer production employing bidentate phosphorus or nitrogen ligands. The starting materials from which the bidentate sulfur ligands are produced are less expensive than the materials from which the phosphorus or nitrogen ligands are produced and the production of the bidentate sulfur ligands is more easily accomplished. Moreover, the sulfur bidentate ligands are less sensitive to oxidation than phosphorous bidentate ligands and thus are more efficiently recycled for subsequent utilization.

The products of the process of the invention are of the same type as those obtained using the more conventional phosphorus or nitrogen ligand-containing catalyst mixtures except for the case of the copolymers of carbon monoxide and styrene or ring-substituted styrene in which a somewhat special case exists. In each case, the polymer of carbon monoxide and a styrene monomer is a linear alternating polymer. However, the linear alternating polymers of carbon monoxide and a styrene or substituted styrene produced by means of a catalyst formed from a bidentate nitrogen ligand according to U.S. Pat. No. 4,788,279 are regioregular, i.e., the organic monomer is incorporated within the polymer chain in a "head-to-tail" arrangement, and are also stereoregular in that the side groups exhibit a regular spacial arrangement relative to the polymer chain. In terminology normally associated with polyolefins such as polypropylene, regioregular and stereoregular polymers are isotactic or syndiotactic. However, in the case of the copolymers of carbon monoxide and a styrene produced according to the present invention employing a bidentate sulfur ligand, the copolymers are regioregular but not stereoregular. Such structure is analogous to what is termed atactic structure in polyolefin technology.

The linear alternating polymer products are thermoplastics and are processed by methods conventional for thermoplastics, e.g., extrusion, injection molding or thermoforming, into sheets, films, fibers and shaped articles of established utility. Specific applications include containers for food and drink and parts and housings for automotive applications.

The invention is further illustrated by the following Illustrative Embodiments which should not be regarded as limiting the invention. In each case, the product was examined by $^{13}$C-NMR analysis and it was determined that the polymer had a linear structure in which CO units alternated with units derived from the ethylenically unsaturated hydrocarbon. It was also established by means of $^{13}$C-NMR analysis that each carbon monoxide/styrene polymer was regioregular but stereo-irregular.

Illustrative Embodiment I

A copolymer of carbon monoxide and ethylene was produced by charging to an autoclave of 250 ml capacity a catalyst composition solution comprising 50 ml of methanol, 0.1 mmol of palladium acetate, 0.3 mmol of p-toluenesulfonic acid, 0.5 mmol of 1,2-di(ethylthio)ethane and 20 mmol of 1,4-benzoquinone. The air present in the autoclave was removed by evacuation and ethylene was added to give a pressure of 20 bar and carbon monoxide was added to give a total pressure of 50 bar. The contents of the autoclave were then heated to 80° C. and maintained at that temperature for 5 hours. Polymerization was then terminated by cooling the autoclave and contents to room temperature and releasing the pressure. The polymer product was recovered by filtration, washed with methanol and dried in vacuo at 70° C. The yield of copolymer was 5.3 g.

Illustrative Embodiment II

A carbon monoxide/ethylene copolymer was produced by a method substantially similar to that of Illustrative Embodiment I except that the catalyst solution contained 30 mmol of 2,4-dinitrotoluene instead of the 1,4-benzoquinone. The yield of copolymer was 7.5 g.

Illustrative Embodiment III

A copolymer of carbon monoxide and ethylene was produced by a method substantially similar to that of Illustrative Embodiment I except that 1,3-di(phenylthio)propane was employed instead of 1,2-di(ethylthio)ethane and 0.5 mmol of p-toluenesulfonic acid was employed instead of 0.3 mmol. The reaction time was 1.5 hour instead of 5 hours. The yield of copolymer was 3.5 g.

Illustrative Embodiment IV

A carbon monoxide/ethylene copolymer was produced by a procedure substantially similar to that of Illustrative Embodiment I except that the catalyst composition solution contained 0.5 mmol of cis-1,2-di(benzothio)ethene instead of 1,2-di(ethylthio)ethane and the reaction temperature was 50° C. instead of 80° C. The yield of copolymer was 19.3 g.

Illustrative Embodiment V

A carbon monoxide/ethylene copolymer was produced by a procedure substantially similar to that of Illustrative Embodiment I except that the catalyst composition solution contained 3 mmol of 1,2-di(phenylthio)propane instead of 1,2-di(ethylthio)ethane and 0.5 mmol instead of 0.3 mmol of p-toluenesulfonic acid. The yield of copolymer was 14.9 g.

Illustrative Embodiment VI

A copolymer of carbon monoxide and ethylene was produced by a procedure substantially similar to that of Illustrative Embodiment I except that the catalyst composition solution contained 0.3 mmol of 1,2-di(phenylthio)ethane instead of 1,2-di(ethylthio)ethane and 0.2 mmol instead of 0.3 mmol of p-toluenesulfonic acid. The yield of copolymer was 1.2 g.

Illustrative Embodiment VII

A copolymer of carbon monoxide and ethylene was produced by a method substantially similar to that of Illustrative Embodiment I except that the catalyst composition solution contained 3 mmol of 1,2-di(ethylthio)ethane instead of 0.5 mmol, 2 mmol instead of 0.3 mmol of p-toluenesulfonic acid and did not contain 1,4-benzoquinone. The reaction temperature was 100° C. instead of 80° C. The yield of copolymer was 8.5 g.

Ilustrative Embodiment VIII

A copolymer of carbon monoxide and ethylene was produced by a procedure substantially similar to that of Illustrative Embodiment I except that the catalyst composition solution contained 0.3 mmol of 1,2-di(methoxyphenylthio)ethane instead of 1,2-di(ethylthio)ethane and 0.2 mmol instead of 0.3 mmol of p-toluenesulfonic acid. The reaction temperature was 50° C. instead of 80° C. The yield of copolymer was 4.7 g.

Illustrative Embodiment IX

A carbon dioxide/ethylene copolymer was produced by a procedure substantially similar to that of Illustrative Embodiment I except that the catalyst composition solution contained 2 mmol instead of 0.3 mmol of p-toluenesulfonic acid and 3 mmol instead of 0.5 mmol of 1,2-di(ethylthio)ethane. The reaction temperature was 100° C. instead of 80° C. The yield of copolymer was 16.5 g.

Illustrative Embodiment X

A carbon monoxide/ethylene copolymer was produced by a procedure substantially similar to that of Illustrative Embodiment I except that the catalyst composition solution contained 2 mmol of trifluoroacetic acid instead of p-toluenesulfonic acid and 3 mmol instead of 0.5 mmol of 1,2-di(ethylthio)ethane. The reaction temperature was 100° C. instead of 80° C. A yield of 7.5 g of copolymer was obtained.

Illustrative Embodiment XI

A copolymer of carbon monoxide and styrene was produced by charging 30 ml of styrene and 20 ml of methanol to an autoclave of 250 ml capacity equipped with a mechanical stirrer. To the mixture in the autoclave was added 0.1 mmol of palladium acetate, 0.5 mmol of p-toluenesulfonic acid, 1.5 mmol of 1,2-di(ethylthio)ethane and 20 mmol of 1,4-benzoquinone. The air present in the autoclave was removed by evacuation and carbon monoxide was added to give a pressure of 40 bar. The contents of the autoclave were then heated to 75° C. and maintained at that temperature for 5 hours. Polymerization was terminated by cooling the reactor and contents to room temperature and releasing the pressure. Methanol was added and the copolymer product was recovered by filtration, washed with methanol and dried in vacuo at 70° C. A yield of 6.5 g of copolymer was obtained.

Illustrative Embodiment XII

A copolymer of carbon monoxide and styrene was produced by a procedure substantially similar to that of Illustrative Embodiment XI except that 30 mmol of 2,4-dinitrotoluene was employed instead of 1,4-benzoquinone. The yield of copolymer was 23 g.

Illustrative Embodiment XIII

A carbon monoxide/styrene copolymer was obtained by a procedure substantially similar to that of Illustrative Embodiment XI except that the catalyst composition solution contained 0.3 mmol instead of 0.5 mmol of p-toluenesulfonic acid and 0.5 mmol of cis-1,2-di(benzylthio)ethene instead of 1,2-di(ethylthio)ethane. The reaction temperature was 50° C. instead of 75° C. A yield of 3.3 g of copolymer was obtained.

Illustrative Embodiment XIV

A carbon monoxide/styrene copolymer was produced by a procedure substantially similar to that of Illustrative Embodiment XI except that 20 ml of diethylene glycol and 10 ml of tetrahydrofuran were employed instead of 20 ml of methanol in the autoclave and the catalyst composition solution contained 30 mmol of 2,4-dinitrotoluene instead of 1,4-benzoquinone. A yield of 6.5 g of copolymer was obtained.

Illustrative Embodiment XV

A copolymer of carbon monoxide and styrene was produced by a procedure substantially like that of Illustrative Embodiment XI except that 20 ml of styrene instead of 30 ml and 30 ml of methanol instead of 20 ml were charged to the autoclave. The catalyst composition comprised 0.5 mmol of copper p-toluenesulfonate instead of p-toluenesulfonic acid and 3 mmol instead of 1.5 mmol of 1,2-di(ethylthio)ethane. The yield of copolymer was 4.1 g.

Illustrative Embodiment XVI

A copolymer of carbon monoxide and norbornene was prepared by a procedure substantially similar to that of Illustrative Embodiment XI except that 30 ml of norbornene was charged to the autoclave instead of styrene, the catalyst composition solution contained 30 mmol of 2,4-dinitrobenzene instead of 1,4-benzoquinone, the reaction temperature was 50° C. instead of 75° C. and the reaction time was 15 hours instead of 5 hours. The yield of copolymer was 3.8 g.

Illustrative Embodiment XVII

A copolymer of carbon monoxide and dicyclopentadiene was produced by a procedure substantially similar to that of Illustrative Embodiment XI except that 30 ml of dicyclopentadiene was charged to the autoclave instead of styrene, the catalyst composition solution contained 30 mmol of 2,4-dinitrotoluene instead of 1,4-benzoquinone, the reaction temperature was 50° C. instead of 75° C. and the reaction time was 15 hours instead of 5 hours. A yield of 5.6 g of copolymer was obtained.

What is claimed is:

1. In the process for the production of linear alternating polymer of carbon monoxide and at least one ethylenically unsaturated hydrocarbon by contacting carbon monoxide and at least one ethylenically unsaturated hydrocarbon under polymerization conditions in the presence of a catalyst composition formed from a palladium compound, the anion of a non-hydrohalogenic acid having a pKa below 2 and a bidentate ligand, the improvement of employing as the bidentate ligand a bidentate ligand of sulfur.

2. The process of claim 1 wherein the bidentate ligand of sulfur has up to 20 carbon atoms and contains two atoms of sulfur connected by a bridging group having at least 2 carbon atoms in the bridge and each sulfur is substituted with an organic radical which is aliphatic, aromatic, alkylaromatic or arylaliphatic.

3. The process of claim 2 wherein the bidentate sulfur ligand is represented by the formula

R-S-R'-S-R wherein R independently is alkyl, aryl, alkaryl or aralkyl and R' is aromatic, saturated or ethylenically unsaturated hydrocarbyl of up to 8 carbon atoms inclusive.

4. The process of claim 3 wherein R' is alkylene of from 2 to 4 carbon atoms inclusive.

5. The process of claim 4 wherein the catalyst composition is formed in the presence of an organic oxidizing agent.

6. The process of claim 5 wherein the agent is selected from 1,4-benzoquinone or 2,4-dinitrotoluene.

7. The process of claim 4 wherein R is ethyl and R' is 1,2-ethylene.

8. The process of claim 4 wherein R is benzyl and R' is 1,2-ethylene.

9. In the process of producing a linear alternating copolymer of carbon monoxide and ethylene by contacting the carbon monoxide and ethylene under polymerization cxonditions in the presence of a catalyst formed from a palladium compound, the anion of a non-hydrohalogenic acid having a pKa below 2, a bidentate ligand and an organic oxidizing agent, the improvement of employing as the bidentate ligand a bidentate ligand of sulfur having up to 20 carbon atoms and 2 sulfur atoms connected by a bridging group having at least 2 carbon atoms in the bridge and each sulfur is substituted with an organic radical which is aliphatic, aromatic, alkylaromatic or arylaliphatic.

10. The process of claim 9 wherein the ligand is 1,2-di(ethylthio)ethane.

11. The process of claim 9 wherein the ligand is cis-1,2-di(benzylthio)ethene.

12. In the process of producing a linear alternating copolymer of carbon monoxide and styrene by contacting the carbon monoxide and styrene under polymerization conditions in the presence of a catalyst composition formed from a palladium compound, the anion of a non-hydrohalogenic acid having a pKa below 2, a bidentate ligand and an organic oxidizing agent, the improvement of employing as the bidentate ligand a bidentate ligand of sulfur having up to 20 carbon atoms and 2 sulfur atoms connected by a bridging group having at least 2 carbon atoms in the bridge and each sulfur is substituted with an organic radical which is aliphatic, aromatic, alkylaromatic or arylaliphatic.

13. The process of claim 12 wherein the ligand is 1,2-di(ethylthio)ethane.

* * * * *